United States Patent
Modave et al.

(10) Patent No.: US 8,855,314 B2
(45) Date of Patent: Oct. 7, 2014

(54) HIERARCHIZATION OF CRYTOGRAPHIC KEYS IN AN ELECTRONIC CIRCUIT

(75) Inventors: Jean-Louis Modave, Ottignies (BE); Thierry Huque, Ramillies (BE)

(73) Assignee: Proton World International N.V., Zaventem (BE)

( * ) Notice: Subject to any disclaimer, the term of this patent is extended or adjusted under 35 U.S.C. 154(b) by 602 days.

(21) Appl. No.: 12/811,810

(22) PCT Filed: Dec. 31, 2008

(86) PCT No.: PCT/EP2008/068386
§ 371 (c)(1),
(2), (4) Date: Nov. 4, 2010

(87) PCT Pub. No.: WO2009/089997
PCT Pub. Date: Jul. 23, 2009

(65) Prior Publication Data
US 2011/0038481 A1    Feb. 17, 2011

(30) Foreign Application Priority Data
Jan. 11, 2008  (FR) ..................................... 08 50169

(51) Int. Cl.
| | | |
|---|---|---|
| *H04L 9/00* | (2006.01) | |
| *G06F 21/79* | (2013.01) | |
| *G07F 7/10* | (2006.01) | |
| *H04L 9/08* | (2006.01) | |
| *G06F 21/77* | (2013.01) | |
| *G06Q 20/34* | (2012.01) | |
| *G06Q 20/38* | (2012.01) | |
| *G06Q 20/02* | (2012.01) | |

(52) U.S. Cl.
CPC .............. *G06F 21/79* (2013.01); *G07F 7/1016* (2013.01); *G06F 2221/2137* (2013.01); *H04L 9/0891* (2013.01); *G06F 21/77* (2013.01); *G06Q 20/3552* (2013.01); *H04L 9/0894* (2013.01); *G07F 7/10* (2013.01); *G06Q 20/3829* (2013.01); *G06Q 20/02* (2013.01)
USPC .......................................... 380/277; 726/22

(58) Field of Classification Search
None
See application file for complete search history.

(56) References Cited

U.S. PATENT DOCUMENTS

2003/0005315 A1* 1/2003 Horvat et al. .................. 713/189
2007/0003062 A1* 1/2007 Mizikovsky et al. ......... 380/270

OTHER PUBLICATIONS

International Search Report dated Feb. 12, 2009 from corresponding International Application No. PCT/EP2008/068386.

\* cited by examiner

*Primary Examiner* — Jeffrey Pwu
*Assistant Examiner* — Carlos Amorin
(74) *Attorney, Agent, or Firm* — Seed IP Law Group PLLC

(57) ABSTRACT

A method of obtaining, in an electronic circuit, at least one first key intended to be used in a cryptographic mechanism, on the basis of at least one second key contained in the same circuit, the first key being stored in at least one first storage element of the circuit, the first storage element being reinitialized automatically after a duration independent of the fact that the circuit is or is not powered. Also described are applications of this method to encrypted transmissions, usage controls, as well as an electronic circuit implementing these methods.

32 Claims, 9 Drawing Sheets

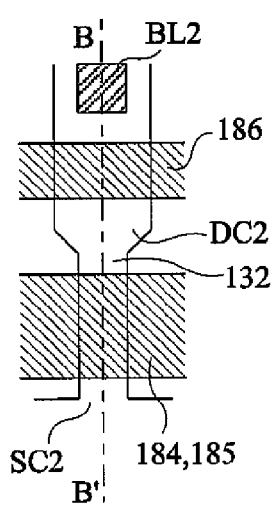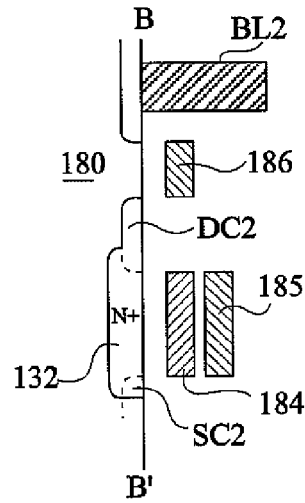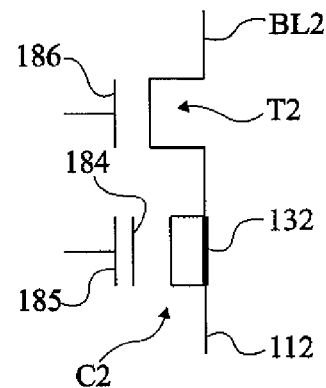
Fig 18A    Fig 18B    Fig 18C
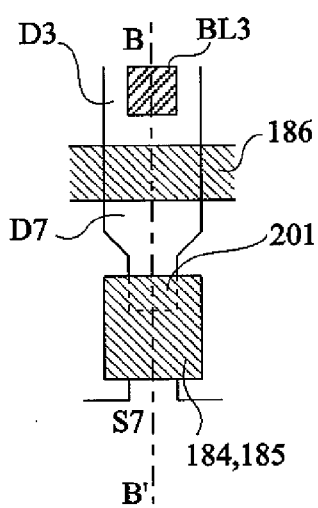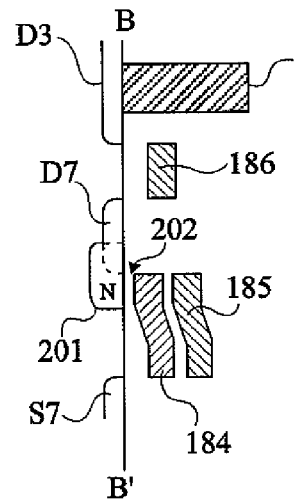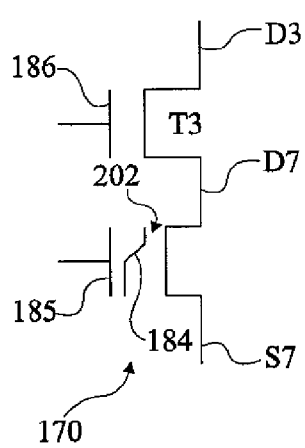
Fig 19A    Fig 19B    Fig 19C

US 8,855,314 B2

HIERARCHIZATION OF CRYTOGRAPHIC KEYS IN AN ELECTRONIC CIRCUIT

CROSS REFERENCE TO RELATED APPLICATIONS

This application is a U.S. national stage patent application based on PCT application number PCTEP2008/068386, entitled "Hierarchization Of Cryptographic Keys In An Electronic Circuit", filed on Dec. 31, 2008 which application claims priority to French patent application number 0850169, filed on Jan. 11, 2008, entitled "Hierarchization Of Cryptographic Keys In An Electronic Circuit" which applications are hereby incorporated by reference to the maximum extent allowable by law.

BACKGROUND OF THE INVENTION

1. Field of the Invention

The present invention generally relates to electronic circuits and, more specifically, to circuits comprising a digital processing unit capable of manipulating ciphering or authentication keys.

The present invention more specifically relates to the protection of ciphering or authentication keys contained in an integrated circuit provided with calculation means, for example, an integrated circuit card or the like.

2. Discussion of the Related Art

The protection of ciphering or authentication keys contained in an electronic circuit against hacking attempts is a recurring problem in cryptography. In particular, it is often desired to protect one or several so-called native initial or primary keys stored in a non-volatile memory of a circuit on manufacturing thereof, more specifically in a customizing phase which ends the manufacturing process. The aim of this protection especially is to avoid problems linked to a so-called key revocation phenomenon in which the key is considered as no longer secure and is no longer used. If this key is an initial key of the circuit, the latter need to then be considered as unusable. To avoid this, a key derivation mechanism is often used, such that only keys derived from this initial or master key are used. If one of the derived keys is no longer reliable, the circuit can then generate a new one. Another countermeasure against hacking attempts comprises using temporary keys transmitted by a distant trusted element and stored in a circuit RAM (for a short-time use or a use in which the circuit remains powered) or in a reprogrammable non-volatile memory (for a longer use or a use extending over several powering periods). Such temporary keys may also be derived by the circuit from an identifier transmitted by the distant element.

For example, in a toll television application, a control word, used to decipher a video flow on the receiver side, is obtained (derived) from temporary keys contains in an integrated circuit card. Such so-called diffusion temporary keys are obtained after a process of secured exchanges between the access provider and the receiver during which the keys are either directly downloaded, or themselves derived from the integrated circuit card of the receiver based on an identifier transmitted by the access provider. The diffusion keys are the same for several users and are only used by the transmitter for a given time period (for example, one month).

A problem is linked to the fact that diffusion keys are widely used in normal use. They are thus very exposed to attacks. Indeed, attacks aiming at hacking keys are most often based on a recurrent analysis calling the keys a great number of times.

Further, the high frequency of use of diffusion keys by the receiver to obtain the control words (generally every few seconds or tens of seconds) makes it impossible to consider a mechanism requiring an exchange with the access provider for each use of the diffusion key. Accordingly, the same key can be used by several users without the access provider noticing. This results in so-called cardless attacks, that is, in the use of diffusion keys by users which do not own the dedicated integrated circuit card. Further, current Internet-type calculation and communication means enable, due to the processing rapidity, several network-connected users to use the same diffusion key without adversely affecting the media display on their respective terminals. These types of attacks are known as sharing attacks.

In another example of application to payment integrated circuit cards, for example, complying with the so-called EMV standard, session keys are used and derived from a basic key contained in an integrated circuit card which should desirably be protected from possible hacking attempts.

In another example still of application to printer cartridges, for example, of inkjet or laser type, it may be desirable to ensure that the cartridges used by a given printer effectively are authorized cartridges, that is, cartridges certified by the manufacturer. In such an application, the hacking of authentication keys contained in an electronic circuit attached to the ink cartridge or to the printer for example enables reusing a same cartridge refilled too many times.

US 2007/003062 discloses a method for distributing a key in a wireless communication system wherein a key is ciphered by another key.

U.S. Pat. No. 7,036,018 discloses an integrated circuit wherein a ciphering key is erased after a duration that is independent from the circuit power supply. This patent provides a time counter that is incremented or decremented independently from the power supply of the circuit, and provides the triggering of the key erasement at the end of the count. A drawback of such a solution is that a hacker observing the states of a register storing the counter can avoid the erasing of the key by disturbing the operation of the circuit between the detection of the threshold attained by the count register and the erasement operation.

SUMMARY OF THE INVENTION

It would be desirable to have a key protection mechanism in a hierarchic key system which overcomes the disadvantages of usual mechanisms.

At least one embodiment specifically is a solution compatible with usual ciphering or authentication key processings. In particular, an embodiment is a solution requiring no modification in the actual authentication and ciphering algorithms, or in the possible key derivation algorithms.

More generally, at least one embodiment is a key derivation mechanism allowing control of the use of such keys along time.

To achieve all or part of these objects, as well as others, at least one embodiment of the present invention provides a method for obtaining, in an electronic circuit, at least one first key intended to be used in a cryptographic mechanism, from at least one second key contained in the same circuit, said first key being stored in at least one first storage element of the circuit, said first storage element being automatically reset after a time period independent from the fact that the circuit is powered or not.

An embodiment of the method provides that the number of uses of the first key within a given period is limited by a counter stored in a second storage element automatically reset after a time period independent from the fact that the circuit is powered or not.

An embodiment of the method provides that the second key is contained in a non-volatile storage element of the circuit.

An embodiment of the method provides that the first key is obtained by derivation of the second key.

An embodiment of the method provides that the second key is used to obtain the first ciphering key by deciphering.

An embodiment of the method provides that the first key is used as a base for the deriving of a third key used to cipher or to authenticate data coming from outside of the circuit.

The present invention also provides a method of ciphered transmission of digital data, in which a key for deciphering the data corresponds to the third key.

The present invention also provides a method for deriving a session key of an EMV application, in which the session key corresponds to the third key.

The present invention also provides a method for controlling the use of ink cartridges by means of a circuit associated with a printer and a key derived from an identifier provided by a cartridge, in which said derived key corresponds to the first key.

At least one embodiment of the present invention also provides an electronic circuit comprising cryptographic processing means and at least one non-volatile memory, said first storage element being formed of at least one storage element comprising at least one first capacitive element exhibiting a leakage through its dielectric space.

An embodiment of the circuit comprises means adapted to implement one of the above methods.

At least one embodiment of the present invention also provides an integrated circuit card or an electronic key, comprising such an electronic circuit.

At least one embodiment of the present invention also provides a system for broadcasting a digital content, comprising:

a transmitter capable of ciphering the content based on a periodically-changing control word transmitted, with the ciphered content, in ciphered fashion from at least one first temporary key of a period greater than that of the control word; and a receiver associated with an electronic circuit capable of deciphering the control word based on said first key and of then deciphering the content based on the control word.

At least one embodiment of the present invention also provides a receiver of such a system.

An embodiment of a receiver comprises an integrated circuit card reader.

At least one embodiment of the present invention also provides a system for controlling the use of ink cartridges by a printer, comprising:

at least one printer associated with at least one electronic circuit; and at least one ink cartridge adapted to transmitting an identifier enabling the circuit of the printer to generate said first key.

The present invention also provides a printer of such a system.

The present invention also provides a cartridge of such a system comprising an electronic circuit provided with a storage element automatically reset after a time period independent from the fact that the circuit is powered or not, this element containing said identifier.

The present invention also provides a bank transaction system using integrated circuit cards, said first key being used to derive session keys corresponding to the transactions.

The foregoing and other objects, features, and advantages of the present invention will be discussed in detail in the following non-limiting description of specific embodiments in connection with the accompanying drawings.

BRIEF DESCRIPTION OF THE DRAWINGS

FIGS. 18A, 18B, and 18C respectively are a top view, a cross-section view along a second direction, and the equivalent electric diagram of a first element of the circuit of FIG. 17A to 17C;

FIGS. 19A, 19B, and 19C respectively are a top view, a cross-section view along the second direction, and the equivalent electric diagram of a second element of the circuit of FIG. 17A to 17C;

DETAILED DESCRIPTION

Figure 1:
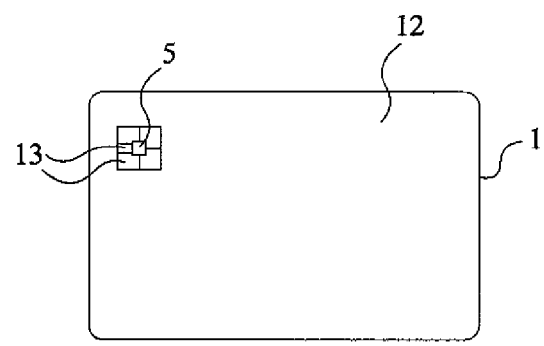
FIG. 1 shows an integrated circuit card of the type to which at least one embodiment of the present invention applies as an example.

The same elements have been designated with the same reference numerals in the different drawings. For clarity, only those elements and steps which are useful to the understanding of the present invention have been shown in the drawings and will be described. In particular, the resources used by an electronic circuit exploiting the keys have not been detailed, the present invention being compatible with any current use of a hardware or software resource. Further, the mechanisms of data communication between the electronic circuit and its environment have not been detailed either, the present invention being here again compatible with usual mechanisms. Further, the ciphering or authentication algorithms using one or several of the implemented keys have not been discussed, the present invention being here again compatible with usual algorithms.

FIG. 1 schematically shows an integrated circuit card 1 of the type to which the present invention applies as an example. Such a card is, for example, formed of a support 12 made of plastic matter, on or in which is placed an electronic circuit chip 5, capable of communicating with the outside by means of contacts 13 or by means of contactless transceiver elements, not shown. Circuit 5 of the card contains a processing unit exploiting one or several ciphering keys, or more generally one or several keys exploited by a cryptographic mechanism.

Figure 2:
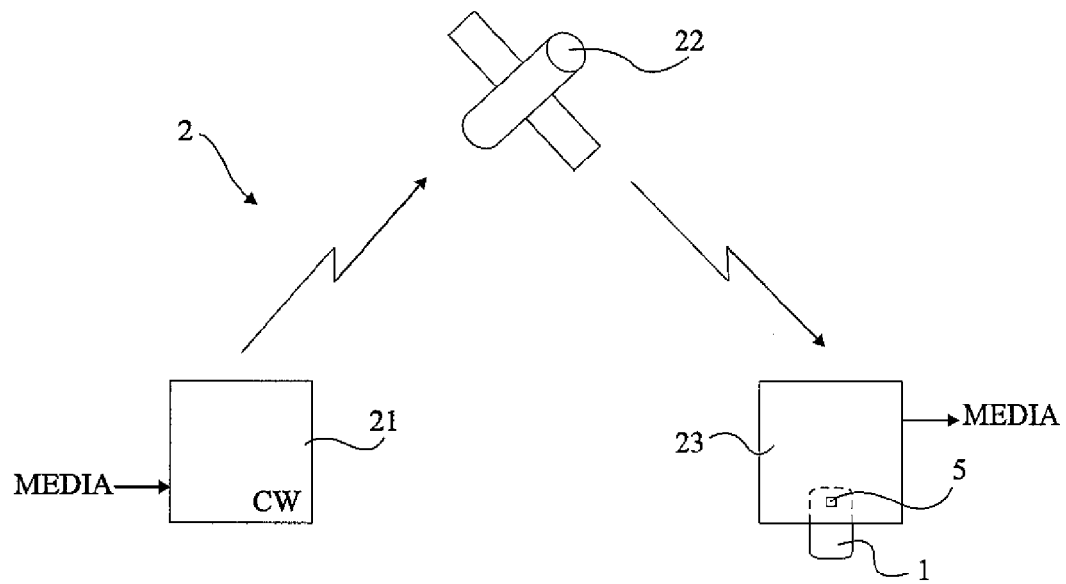
FIG. 2 illustrates a broadcasting system of the type to which at least one embodiment of the present invention applies as an example.

FIG. 2 is a block diagram of an example of application to a controlled-access broadcasting system. This example relates to the satellite broadcasting of digital media. On the side of diffuser 21, a digital content MEDIA (possibly originating from a digital coding of an analog content) is ciphered by means of a control word CW, prior to its broadcasting. After transmission, for example, via a satellite 22, a wired network, the Internet, etc., a decoder 23 converts the signals on the receive side to make them interpretable (for example, by converting them into video signals), and deciphers the data based on the same control word CW (symmetrical ciphering) or on a control word linked to the transmit control word by an asymmetrical mechanism (public key—private key). On the side of receiver 23, the control word is obtained from a temporary key contained, for example, in circuit 5 of an integrated circuit card 1 dedicated to each user. The temporary key is periodically changed (for example, each month). It is either transmitted to the card by the address provider through a secure mechanism, or derived by the card from an identifier broadcast from the transmitter and a base key contained in the card since its manufacturing. Decoder 23 and deciphering circuit 5, often called conditional access module or CAM, are generally distinct. This module may also be supported by an electronic board of the decoder.

Figure 3:
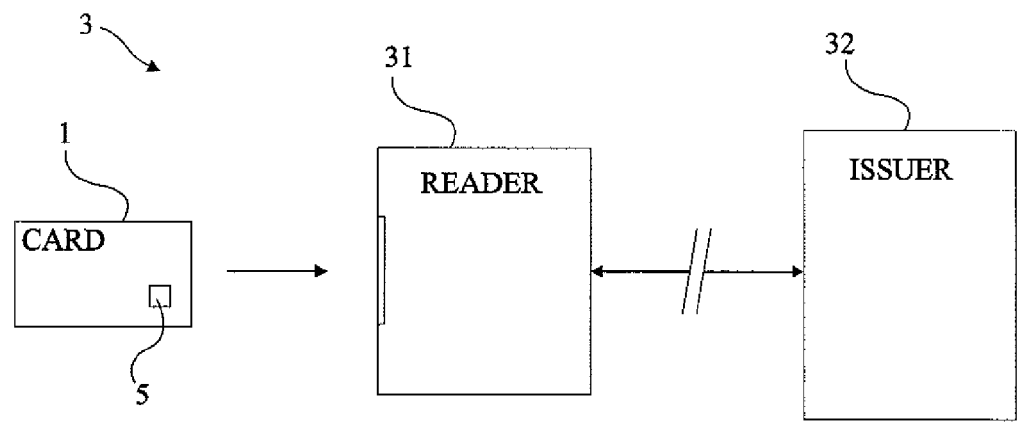
FIG. 3 illustrates a payment card system of the type to which at least one embodiment of the present invention applies as an example.

FIG. 3 is a block diagram of another example of application to a payment card system 3. This example concerns the use of an integrated circuit card 1 (CARD) for payment operations, for example, complying with the EMV standard. Card 1 is introduced into a reader 31 (READER) of system 3 and has the function of enabling authentication of the card bearer to authorize a bank transaction. This transaction is performed via a central system 32 (ISSUER), generally the bank of the holder of reader 31. This bank then communicates with that (not shown) of the card bearer to perform the transaction.

Figure 4:
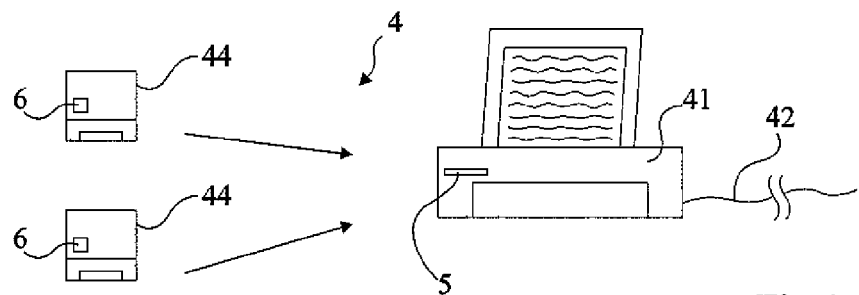
FIG. 4 illustrates a cartridge printer system of the type to which at least one embodiment of the present invention applies as an example.

FIG. 4 is a block diagram of still another example of application to a cartridge printer system 4. A printer 41, intended to be wired or connected wireless (connection 42) to a computer system (not shown), contains one or several ink cartridges 44. Each cartridge is provided with an electronic circuit 6 at least capable of communicating one digital identifier to an electronic circuit 5 equipping printer 41. The identifier enables circuit 5, among others, to authenticate cartridge 44.

Figure 5:
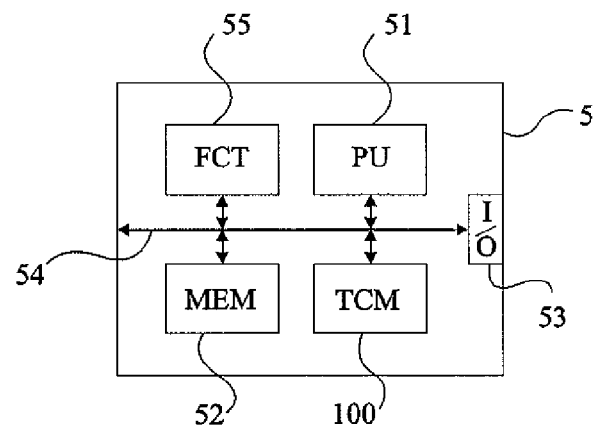
FIG. 5 is a block diagram of an embodiment of an electronic circuit.

FIG. 5 is a block diagram of an embodiment of an electronic circuit 5, for example contained in an integrated circuit card 1 of FIGS. 1, 2, 3 in a printer of FIG. 4 or in another access-control module (of electronic key type or other). Circuit 5 comprises, among others, a digital processing unit 51 (PU), one or several memories 52 (MEM) among which one non-volatile memory (for example, of EEPROM type), and a RAM, and an input/output circuit 53 (I/O) to communicate with the outside of circuit 5 (for connection to contacts 13 or to an antenna, for example). The different elements internal to circuit 5 communicate together and with interface 53 over several data, address, and control buses 54, as well as over possible direct connections between some of these elements. Circuit 5 may also integrate other software or hardware functions, symbolized by a block 55 (FCT) in FIG. 5.

In the different applications aimed at, circuit 5 also comprises at least one circuit 100 (TCM) of temporary charge retention storage elements having their charge level varying along time, even when circuit 5 is not powered. Circuit 100 forms one or several time-controlled memory elements.

Detailed examples of circuits 100 will be described hereafter in relation with FIG. 12 and the following. For the time being, it should only be noted that each memory cell of a circuit 100 is capable of being programmed or activated (placed in a state arbitrarily designated as 1) by charge injection or extraction into and from a capacitive element which exhibits a leakage through its dielectric space, so that its active state disappears (the element switches back to state 0) after a given time, independently from the possible circuit powering.

Such a charge retention circuit 100 stores a binary state or several states forming a binary word forming a temporary key.

Figure 6:
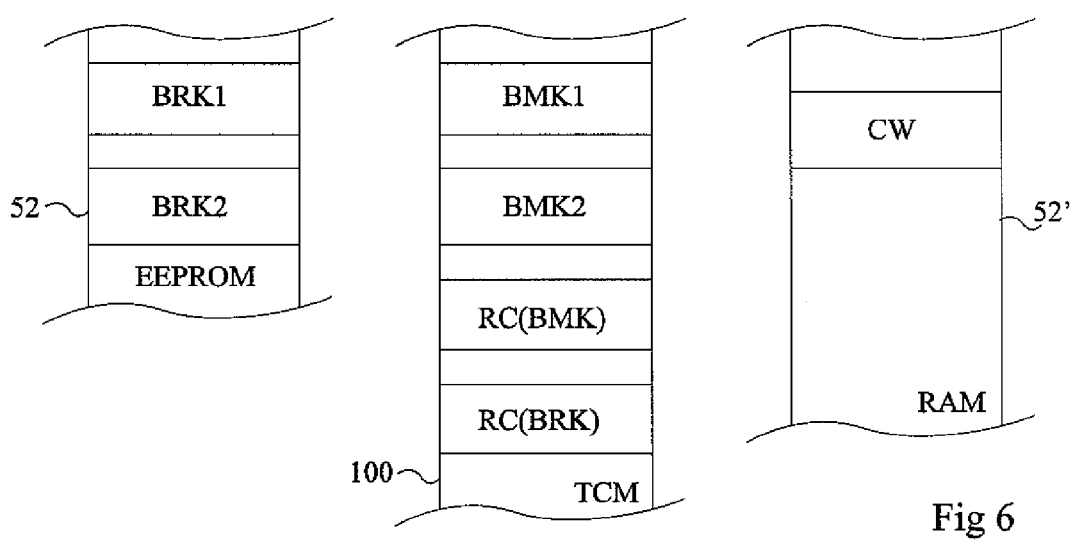
FIG. 6 illustrates an example of contents of memories of an electronic circuit in the application of FIG. 2.
Figure 7:
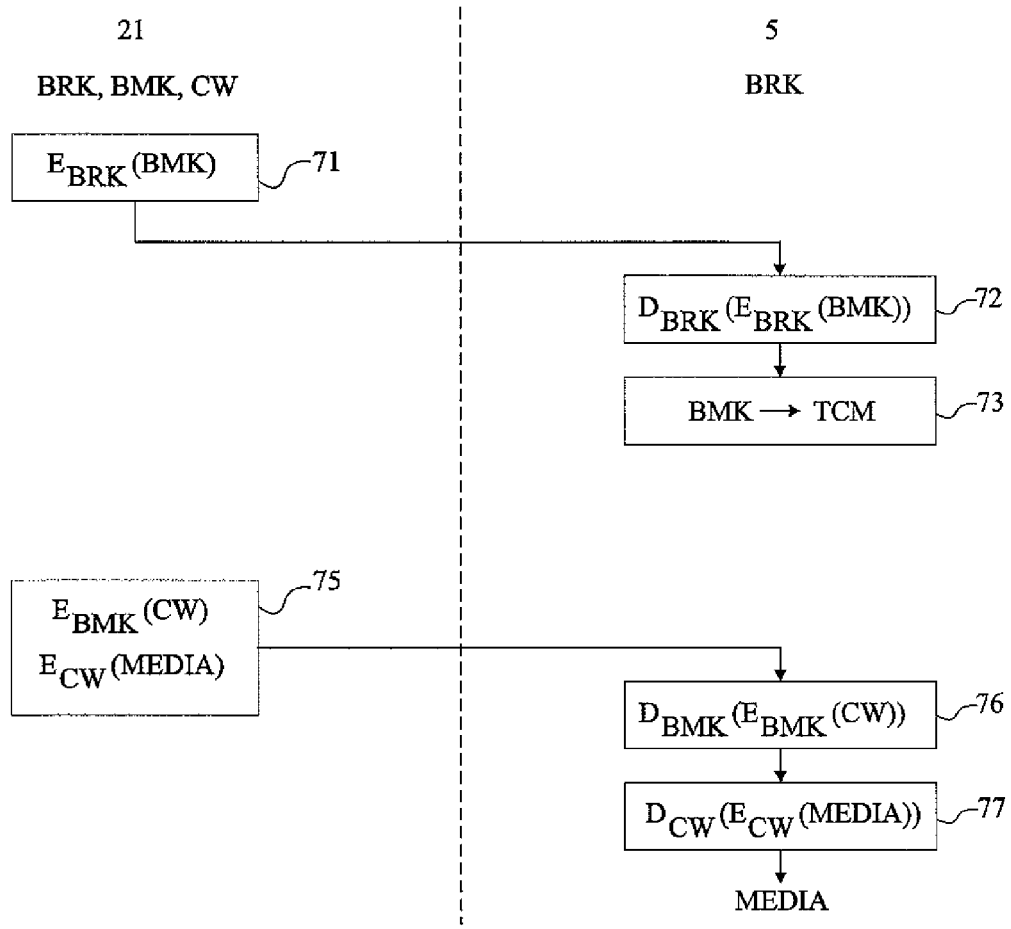
FIG. 7 is a timing diagram illustrating an embodiment according to this example of application.

FIGS. 6 and 7 illustrate an example of application to a broadcasting system of the type in FIG. 2. FIG. 6 illustrates the content of three memory areas distinct from circuit 5 among which an EEPROM-type non-volatile reprogrammable memory 52, a RAM-type memory 52', and a time-controlled memory 100 (TCM).

A control word CW is used by the transmitter (21, FIG. 2) to cipher the media content and must be known by the receiver (23, FIG. 2), more specifically, by the circuit 5 which is associated therewith (be it in an integrated circuit card 1, in an embedded circuit, or in an access-control module). Word CW is stored in a RAM in circuit 5 since it changes at a relatively high frequency, typically less than one minute.

The service provider (for simplification, assumed to be one with transmitter 21) and, in this example, card 1, share a broadcast monthly key BMK which is a temporary key of a duration (for example, one month) greater than that of word CW and which is used by circuit 5 to decipher control words CW transmitted by the transmitter and ciphered with key BMK. Without key BMK, the decoder is unable to decipher the successive words during its validity period, and thus to decode the transmitted content. Key BMK generally is a key common to several circuits 5 of different users.

The transmission of temporary key BMK to the different users is preceded by a control of their rights (for example, subscription rights). For this purpose, circuit 5 contains at least one broadcast root key BRK in a non-volatile EEPROM. In the example, two root keys BRK1 and BRK2 are provided either to enable repudiation of one of them if necessary, or to dedicate each key to an application (a category of digital contents). The number of root keys may vary according to the application and according to the size of the available EEPROM. The BRK key(s) are preferably stored in the card during its customization phase. As a variation, the base keys may be stored in a one-time programmable non-volatile memory (OTP) by being, preferably, individualized per circuit. The BRK keys are used by the broadcaster to send to the card the temporary BMK keys (BMK1 and BMK2) which are stored in memory 100. The temporary BMK keys are preferably stored in dedicated locations in memory 100. The charge retention time of memory 100 defines their maximum lifetime. By selecting a duration at least equal to the maximum provided validity time, it is ensured that a monthly key cannot be used or attacked for a time period greater than this retention time period since it will have disappeared from memory 100 at the end of this period. This prevents recorded programs from being replayed (executed) ex post facto.

In the above example; it is assumed that the resistance of circuit 5 against attacks is such that the probability for a hacker to find a BMK key within one month is negligible. This example may be adapted to other BMK key durations. For example, weekly keys may be used.

FIG. 7 illustrates an embodiment of the example of FIG. 6.

Broadcaster 21 owns quantities BRK, BMK, and CW. Initially, circuit 5 only owns the BRK key (or the BRK keys). Every month, access provider 21 changes the BMK key and transmits it in ciphered fashion (block 71, $E_{BRK}(BMK)$) to decoder 23, more specifically to its module or circuit 5. Circuit 5 deciphers the BMK key (block 72, $D_{BRK}(E_{BRK}(BMK))$), then stores it in memory 100 (block 73, BMK→TCM).

After, during the broadcasting, transmitter 21 scrambles or ciphers (block 75, $E_{BMK}(CW)$, $E_{CW}(MEDIA)$) each control word with the BMK key and data MEDIA with control word CW before transmitting both of them to the decoder. Circuit 5 on the decoder side deciphers control word CW by using the BMK key (block 76, $D_{BMK}(E_{BMK}(CW))$), then deciphers the data by means of this control word (block 77, $D_{CW}(E_{CW}(MEDIA))$). Ciphering and deciphering algorithms E and D may be different for the BMK key, control word CW, and data MEDIA. Similarly, the case of a symmetrical algorithm where the same key is shared and used for ciphering and deciphering has been illustrated, but asymmetrical algorithms with public and private keys may be used at least for the cipherings of keys BMK and CW.

Preferably, one or several ratification mechanisms are added to limit the number of possible uses of temporary key BMK and/or of root key BRK within a given time period. Such ratifications are performed by means of ratification counters RC which enable counting down the number of times that the BRK and BMK keys are used within a given period. By storing counters RC(BMK) and RC(BRK) in time-controlled storage elements of circuit 100, the period control is performed automatically by charge retention circuit 100 since the counter states disappear at the end of the period for which circuit 100 has been designed.

Figure 8:
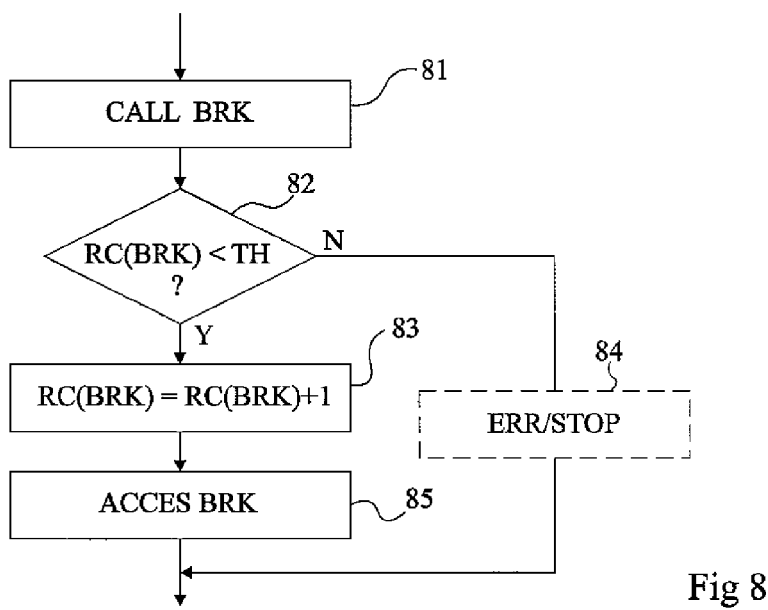
FIG. 8 is a simplified timing diagram of an embodiment of a ratification mechanism.

FIG. 8 is a simplified functional block diagram illustrating an embodiment of the counter-ratification mechanism, for example, of the BRK key.

Each time the BRK key is called (block 81, CALL BRK), it is started by checking (block 82, RC(BRK)<TH?) the state of a counter RC(BRK) against a threshold TH. This threshold is selected according to a reasonable number of uses in normal conditions.

If threshold TH has not been reached by the counter (output Y of block 82), the counter is incremented (block 83, RC(BRK)=RC(BRK)+1), and the use of the key is authorized (block 85, ACCESS BRK).

If the number of uses exceeds the threshold (output N of block 82), the access to the key is denied. For example, the mechanism directly proceeds to the next processing (word CW then is not deciphered and is unusable) or implements an error processing (block 84 in dotted lines, ERR/STOP), or even a temporary or definitive blocking of the circuit.

Due to the use of a charge retention circuit with an activated state which disappears after a given time, counter RC(BRK) automatically resets, independently from the powering of electronic circuit 10'. Accordingly, it is now possible to limit the number of uses within a given period. This use of counter RC(BRK) enables further complicating attacks, for example, by differential power analysis (DPA) on key BRK.

Of course, instead of incrementing counter RC(BRK), it is possible to set the counter to limiting number TH, and to decrement it to detect when it reaches zero.

Counter RC(BMK) is, for example, incremented on each use of the BMK key to decode a control word CW. Counter RC(BMK) enables limiting the number of uses of the BMK key within the fixed time period. This time period is short as compared with the retention time period of counter RC(BRK). For example, by limiting the number of uses of the control word to two every ten seconds, card sharing attacks are prevented for words CW changing every ten seconds, while allowing a second decoding in case of need (for example, for a redundancy in case there is an error).

Figure 9:
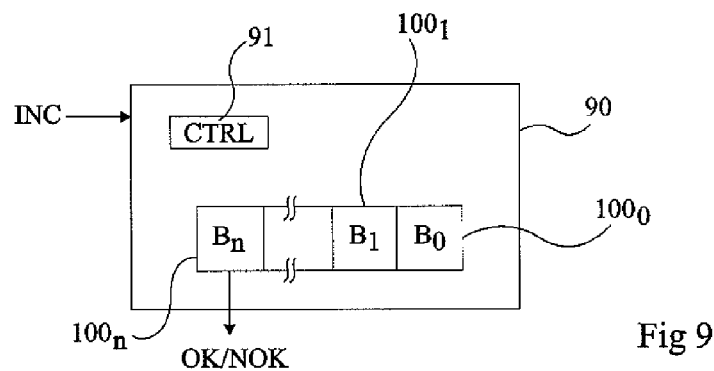
FIG. 9 is a simplified block diagram of a counter used in the mechanism of FIG. 8.

FIG. 9 very schematically shows in the form of blocks an example of a counting circuit 90 containing n electronic charge retention circuits $100_0, 100_1, \ldots, 100_n$ each storing a bit $B_0, B_1, \ldots, B_n$ of counter RC(BMK) or RC(BRK). Circuit 50 preferably is controlled by an internal circuit 91 (CTRL) causing, as will be better understood hereafter in relation with FIG. 12 and the following, the counter incrementation after a malfunction has been detected (inputs INC of block 90), as well as the reading of the state of one or several bits of the counter.

In the example illustrated in FIG. 9, it is assumed that the most significant bit $B_n$ defines threshold TH. Indeed, a state switching of this bit amounts to an overflow with respect to count $2^{n-1}-1$. The reading of this single bit is then enough to provide a signal OK/NOK indicative of the result of test 82 (FIG. 8).

An advantage of such an overflow comparison is that it makes a same hardware embodiment of circuit 90 versatile. Indeed, threshold TH can then easily be adapted whatever the number of structural bits of counter 90 by selecting that of the counter bits to be taken into account to provide result OK/NOK of test 82.

For counter RC(BMK), the above mechanism preferably operates in countdown mode from a value set to 2 on each new reception of a word CW (for example, every ten seconds) and decremented on each use of word CW. A new use is then forbidden if the counter is at zero. The advantage of a counter stored in memory 100 rather than in a RAM is that its value disappears in any case after the time period set by circuit 100 (for example, the same as the changing frequency of word CW), forbidding any pursuit of a fraudulent use.

It should be noted that the transmitter of the broadcasting system needs no modification. If the deciphering circuits are included in the receiver, only the latter requires being adapted. If the receiver uses an integrated circuit card as a deciphering circuit, it does not need any modification either.

Figure 10:
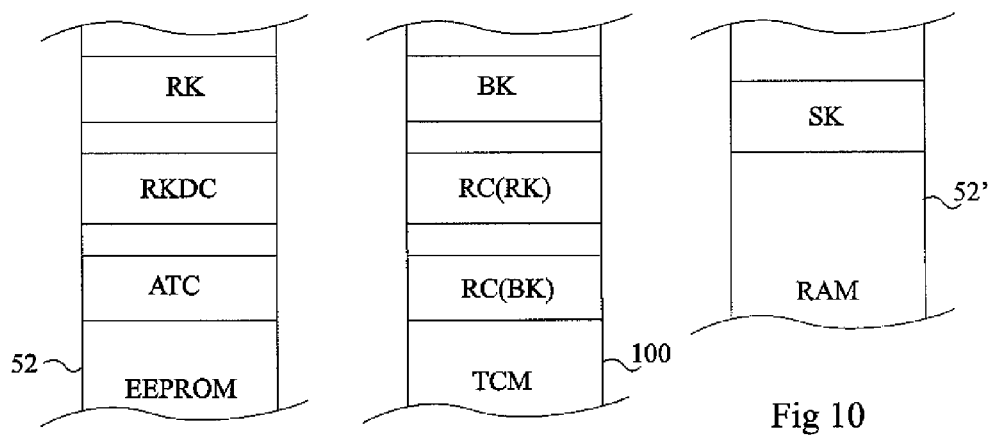
FIG. 10 illustrates an example of memory contents of an electronic circuit in the application of FIG. 3.

FIG. 10 illustrates another example of use of circuit 5 in an application to a payment card system. This drawing shows an example of the content of three memories 52, 52', and 100 of circuit 5 of an integrated circuit card 1 according to this example of application.

In an EMV-type bank system, it is not possible to transfer weekly or monthly keys into the card, be it only for the difficulties in controlling the time interval between two transactions that may be performed on line, that is, with a connection between the card and the control bank, with a great number of transactions being performed off line, that is, with no communication with the control bank. Temporary keys can however be derived from the keys contained in memory 52 and thus replace usual key derivation mechanisms in an integrated circuit card.

In the illustrated example, a root key RK is stored in the integrated circuit card on customization of its EEPROM. Key RK is associated with a counter of the number of its derivations RKDC (Root Key Derivation Counter) as well as with an authorization transaction counter ATC also stored in reprogrammable non-volatile memory 52.

With a periodicity which is defined in advance (for example, every week), key RK is derived by circuit 5 to obtain a base key BK (base key) which is stored in controlled charge retention memory 100. Base key BK is then derived on each transaction by using transaction counter ATC to obtain a RAM-stored session key SK which is used for transaction authorization exchanges between the reader and the card. The transaction counter is the identifier of the index of the session key in the key derivation tree, enabling the central system with which the card communicates to find the same session key.

Since the lifetime of a card is fixed (generally a few years, for example, 4), counter RKDC of derivation of key RK set in the EEPROM may be coded over a single byte for one derivation per week. Its value is, for example, sent to the card provider in addition to the transaction number for each authorization message to validate a derivation of a session key.

Preferably, the number of possible uses of a base key per time interval (for example, per hour) is limited by means of a ratification counter RC(BK) stored in memory 100. For example, the possible number of uses, and accordingly, the possible number of transactions per hour, may be limited to 20. As in the previous example of application, the counter resets automatically.

According to another variation, a similar counter RC(RK) is used for the derivations of key RK. This adds security with respect to counter RKDC by limiting the number of derivations within a given time.

In the above transaction systems, only the integrated circuit card and the cryptography unit of the authorization system need be adapted, and the readers and other servers of the system can remain unchanged.

Figure 11:
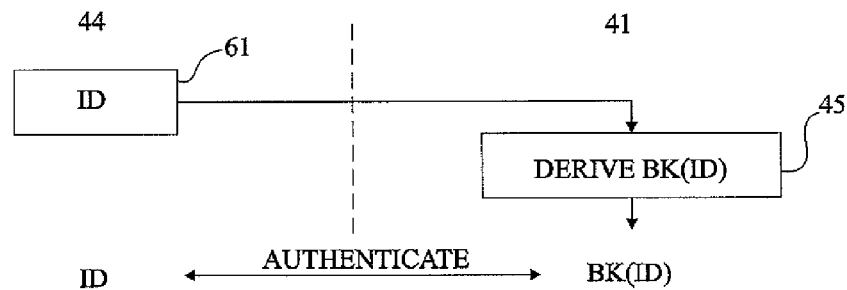
FIG. 11 illustrates an example of memory contents of an electronic circuit in the application of FIG. 4.

FIG. 11 illustrates an example of application associated with the printer system of FIG. 4. In this example, a base key contained in printer 42 is derived a given number of times to communicate with a cartridge inserted into the printer, which owns a key since its manufacturing. Two factors may lead to a need to change keys. A first factor is too many uses of the key due to too many uses of the cartridges (too many refills). A second case is linked to the ink use-before date, the cartridge being expired.

On the printer side, integrated circuit 5 comprises a time charge retention memory area 100 enabling limiting the number of uses of the key, that is, the number of introductions of the cartridge into the printer.

A temporary session key is thus created by means of a usual key derivation algorithm (for example, of AES type) based on a base key BK contained in the printer adapter. Index ID of the derived key in a key derivation tree depends on an identifier of the cartridge (block 61, ID) communicated by said cartridge on introduction thereof into the printer and enabling, in case of a conformity between the cartridge and the printer, to find the right session key. The key derived on the printer side (block 45, DERIVE BK(ID)) is stored in a memory area 100 of circuit 5.

The printer starting is conditioned by the use and the obtaining of the correct session keys, which enables authenticating the cartridge (AUTHENTICATE) and reserving the use of the printer to the use of original cartridges or, at least cartridges authorized by the manufacturer. The authentication test is performed, for example, on each use of the printer.

The fact of storing temporary key BK(ID) in memory 100 enables making its validity period independent from the printer powering. This is particularly advantageous since a printer is only seldom permanently powered.

In the above example, the cartridges have required no modification, and only the electronic circuits of the printers are adapted to contain storage elements 100.

Preferably, a duration of the use of cartridge 44 is also set by means of a time charge retention memory 100 contained in circuit 6 of the cartridge. One or several bits are activated in the cartridge chip on manufacturing thereof and/or on refilling thereof by an authorized technician and this active state automatically disappears when the duration has expired. An induced advantage is that a resetting of the duration of cartridge use can only be performed with a tool capable of reprogramming the dedicated area of memory 100, and accordingly, ex ante, an authorized element. Once the provided duration has expired, the identifier contained in the cartridge disappears and the cartridge will not be recognized by the printer.

Figure 12:
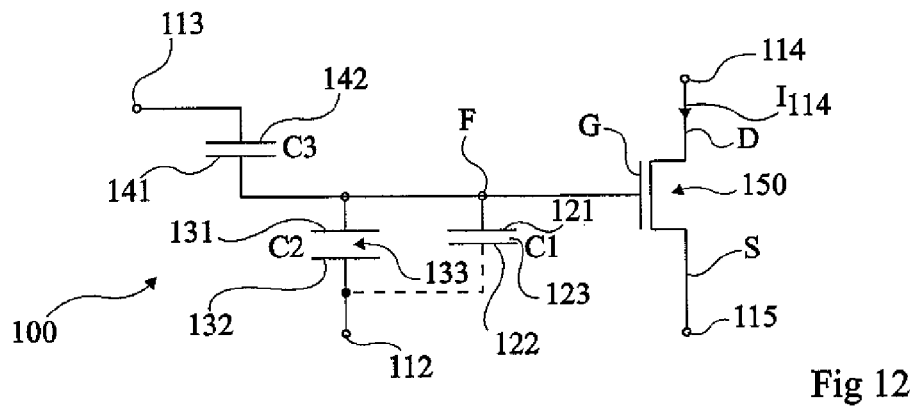
FIG. 12 shows an embodiment of an electronic charge retention circuit.

FIG. 12 shows a preferred example of a charge retention circuit 100. Such a circuit is an element for storing a bit of a key or of a previously-described counter.

Circuit 100 comprises a first capacitive element C1 having a first electrode 121 connected to a floating node F and having its dielectric 123 designed (by its permittivity and/or by its thickness) to exhibit non-negligible leakages along time. Floating node F designates a node not directly connected to any diffused region of the semiconductor substrate in which circuit 100 (and circuit 10') is preferentially formed, and more specifically, separated by a dielectric space from any voltage application terminal. Second electrode 122 of capacitive element C1 is either connected (dotted lines in FIG. 12) to a terminal 112 intended to be connected to a reference voltage (for example, the ground), or left floating.

A second capacitive element C2 has a first electrode 131 connected to node F and a second electrode 132 connected to terminal 112. Capacitive element C2 exhibits a charge retention capacity greater than that of capacitive element C1.

Preferably, a third capacitive element C3 has a first electrode 141 connected to node F and a second electrode 142 connected to a terminal 113 of circuit 100, intended to be connected to a power source on initialization of a charge retention phase (activation of the stored bit to state 1).

A function of capacitive element C2 is to store an electric charge. A function of capacitive element C1 is to relatively slowly discharge storage element C2 (as compared with a direct connection of its electrode 131 to ground) due to a leakage through its dielectric space. The presence of capacitive element C2 enables dissociating the charge level present in circuit 100 from the discharge element (capacitance C1). The thickness of the dielectric of element C2 is greater than that of element C1. The capacitance of element C2 is greater, preferably by a ratio of at least 10, than that of element C2.

A function of capacitive element C3 is to enable a charge injection into capacitive element C2 by Fowler-Nordheim effect or by a hot electron injection phenomenon. Element C3 enables avoiding the stress on element C1 on charge of elements C2 and C1 in parallel. The thickness of the dielectric space of element C3 is greater than that of element C1, to avoid introducing a parasitic leakage path.

Node F is connected to a gate G of a transistor with an isolated control terminal (for example, a MOS transistor 150) having its conduction terminals (drain D and source S) connected to output terminals 114 and 115 to measure the residual charge contained in element C2 (neglecting the capacitance of element C1 in parallel). For example, terminal 115 is grounded and terminal 114 is connected to a current source (not shown) enabling current-to-voltage conversion of drain current $I_{114}$ in transistor 150.

The thickness of the gate dielectric of transistor 150 is greater than that of the dielectric of element C1 to avoid introducing an additional leakage on node F. Preferably, the gate thickness of transistor 150 is even greater than the thickness of the dielectric of element C3, to avoid introducing a parasitic programming path (of injection or extraction of charges into or from node F).

The interpretation of the stored level may be simply performed by means of a comparator, the switching of which occurs as long as the charge of node F remains sufficient. The level for which the comparator switches then defines the state switching level of the bit stored by element 100. Other read solutions may be envisaged, for example, a multiple-level interpretation in an embodiment where circuit 100 directly stores several bits.

Figure 13:
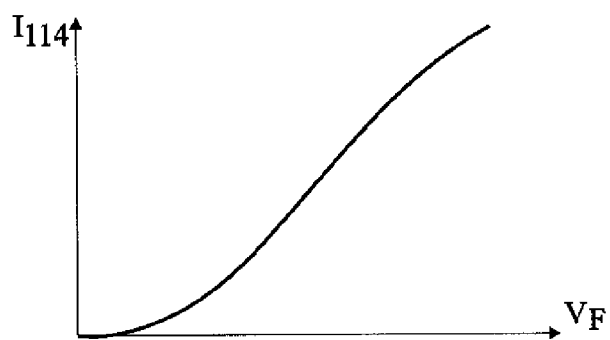
FIG. 13 is a current-vs.-voltage diagram illustrating the operation of the circuit of FIG. 12.

FIG. 13 shows an example of the shape of drain current $I_{114}$ of transistor 150 versus voltage $V_F$ at node F, referenced with respect to terminal 115. Voltage $V_F$ then expresses the gate/source voltage of transistor 150. It depends on the residual charge across capacitances C1 and C2 in parallel, and thus essentially on the residual charge in capacitance C2. The evaluation of drain current $I_{114}$ may be performed by maintaining terminals 112 and 115 at the same voltage (for example, the ground) and by applying a known voltage on terminal 114.

Figure 14:
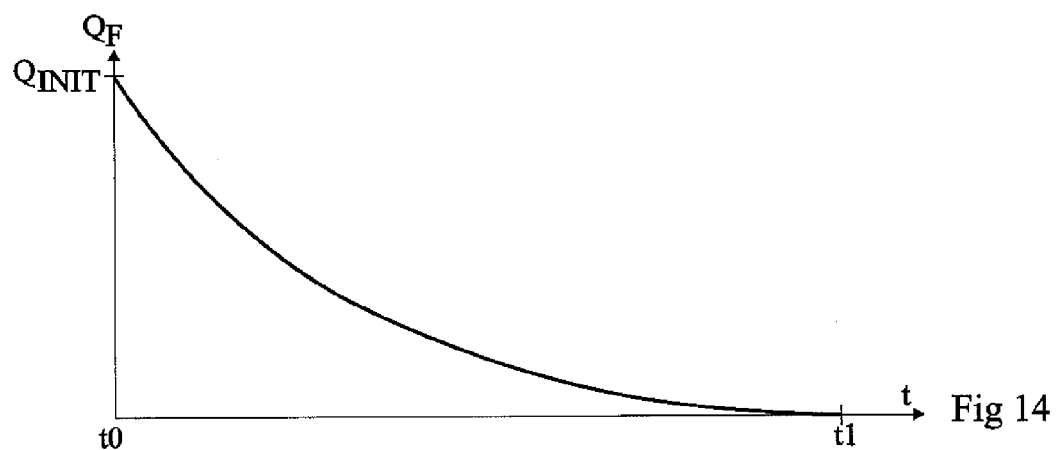
FIG. 14 is a timing diagram illustrating the operation of the circuit of FIG. 12.

FIG. 14 illustrates the variation of charge $Q_F$ at node F along time. At a time t0 when a (programming) power supply voltage stops being applied on terminal 113, charge $Q_F$ starts from an initial value $Q_{INIT}$ to become zero at a time t1 with a capacitive discharge shape. The time interval between times t0 and t1 depends not only on the leakage capacity of the dielectric of element C1 but also on the value (and thus on the storage capacity) of element C2, which conditions value $Q_{INIT}$.

Assuming that terminals 112 and 115 and second electrode 122 of capacitive element C1 are at reference voltages and that terminal 114 is biased to a determined level so that a current variation $I_{114}$ only results from a variation of the voltage at node F, this variation then only depends on the time elapsed since time t0. This result is, in the shown embodiment, obtained by the dissociation performed between the time leakage element (C1) and the element representative of the residual charge (C2).

The programming or activation of circuit 100 (switching to state 1 of the stored bit) through capacitive element C3 protects capacitive element C1 which has a relatively thin oxide thickness (dielectric), and which would otherwise risk being deteriorated on programming. This especially enables making the measurements reliable and reproducible along time.

Several capacitive elements C3 may be connected in parallel between terminal 113 and node F to accelerate the programming time.

Similarly, the retention time may be adapted not only by setting the thicknesses and/or the permittivities of the dielectrics of elements C1 and C2 but also by providing several elements C1 and/or C2 in parallel.

Figure 15:
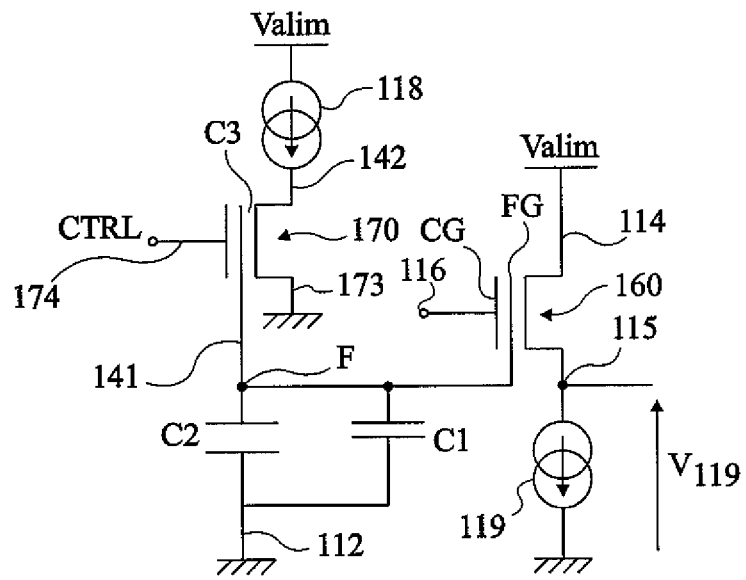
FIG. 15 shows another embodiment of a charge retention circuit in an example of environment.

FIG. 15 shows the electric diagram of another embodiment of a charge retention circuit 100'.

As compared with the embodiment of FIG. 12, transistor 150 is replaced with a transistor 160 with a floating gate FG connected to node F. Control gate CG of transistor 160 is connected to a terminal 116 for controlling the reading of the residual charge in circuit 100' (and thus of the state of the stored bit). The thickness of the dielectric, between floating gate FG and the channel (active area) of transistor 160, is greater than that of element C1 and preferentially greater than that of element C3.

Another difference is that element C3 for injecting or extracting charges is a floating-gate MOS transistor 170. Floating gate 141 of transistor 170 is connected to node F.

In the example of FIG. 15, the circuit has been shown in part of its environment. Drain 142 of transistor 170 is connected to a current source 118 receiving a supply voltage Valim and its source 173 is grounded. Its control gate 174 receives a control signal CTRL intended to turn on transistor 170 when a charge injection is needed. The drain (terminal 114) of transistor 160 receives supply voltage Valim and its source is grounded by a current source 119 (this variation is the inverse of the embodiment described in relation with FIG. 12). Voltage $V_{119}$ across current source 119 is representative of the voltage at node F and is used to switch the output of a comparator (not shown).

Figure 16:
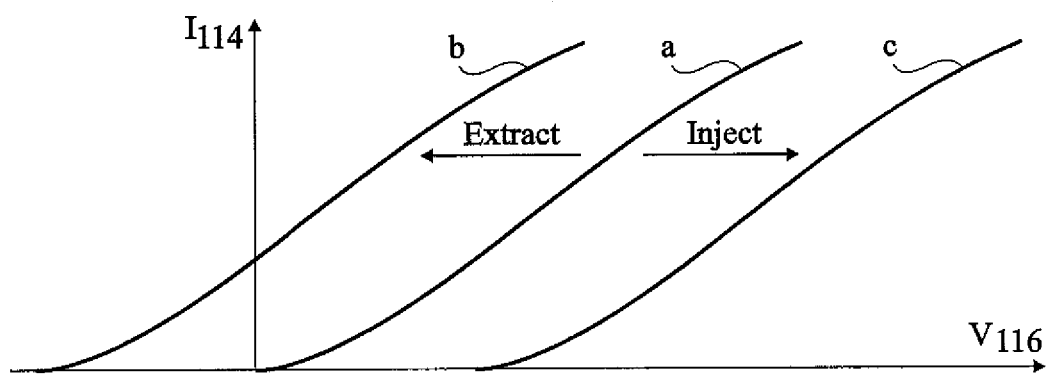
FIG. 16 is a current-vs.-voltage graph illustrating the operation of the circuit of FIG. 15.

FIG. 16 illustrates, in a diagram of current $I_{114}$ versus voltage $V_{116}$ applied on the control gate, the operation of the circuit of FIG. 15. For explanation needs, it is assumed that the voltage at drain terminal 114 and source terminal 115 of transistor 160 is maintained constant by the external read circuit. The voltage drop between the floating gate and terminal 115 then depends on the electric charge present at node F, on the total capacitance between nodes F and 112 (essentially, capacitances C1 and C2), and on the voltage applied on control gate 116 of transistor 160. In FIG. 16, three curves a, b, and c have been illustrated. Curve a shows the case where node F is fully discharged. Curve b shows the case of a positive charge present on node F (electron extraction). The threshold of transistor 160 is then lowered. Curve c shows the case of a negative charge at node F (electron injection), which generates a greater threshold for MOS transistor 160.

According to applications, charges may be injected into or extracted from node F to modify the characteristic of transistor 160 from curve a to one of curves b and c. Once isolated from the programming voltage, the leakage of capacitance C1 enables returning to curve a along time. A measurement of current $I_{114}$ (and thus of voltage $V_{119}$) for a zero voltage $V_{116}$ enables detecting that the time has expired (resetting of the bit to zero) when current $I_{114}$ becomes zero.

After, an electron extraction (application on terminal 113 of an activation or programming voltage positive with respect to terminal 112) by Fowler-Nordheim effect is assumed. The operation which will be described however easily transposes to an electron injection at node F, for example, by a so-called hot carrier phenomenon by applying adapted voltages between terminals 142, 173, and 174.

Different voltages may be used in programming and in reading, provided that they have an exploitable reference between the residual charge and the interpretation of the state of the stored bit.

According to a specific embodiment, a charge retention circuit is formed with the following values:

capacitance C1: approximately 2 fF, dielectric thickness: approximately 40 Å;

capacitance C2: approximately 20 fF, dielectric thickness: approximately 160 Å;

capacitance C3: approximately 1 fF, dielectric thickness: approximately 80 Å.

Such a circuit may be initialized by application of a voltage on the order of 12 volts and is discharged after approximately one week. This is of course an example only, the dielectric thicknesses and the possible parallel association of several elements C1 or C2 conditioning the charge retention time.

FIGS. 17A, 17B, 17C, 18A, 18B, 18C, 19A, 19B, 19C, 20A, 20B, 20C, 21A, 21B, and 21C show an embodiment of a circuit 100' according to the embodiment of FIG. 15 in an integrated structure, derived from an EEPROM architecture.

Figure 17A:
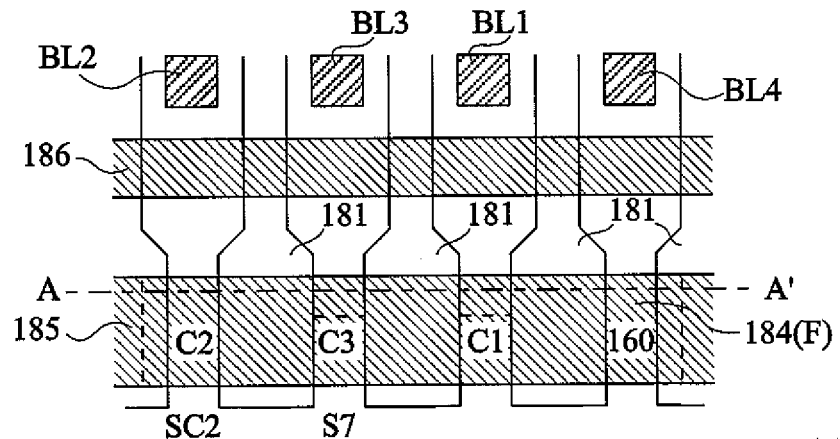
FIGS. 17A, 17B, and 17C respectively are a top view, a cross-section view along a first direction, and the equivalent electric diagram of an electronic charge retention circuit based on EEPROM cells.
Figure 17B:
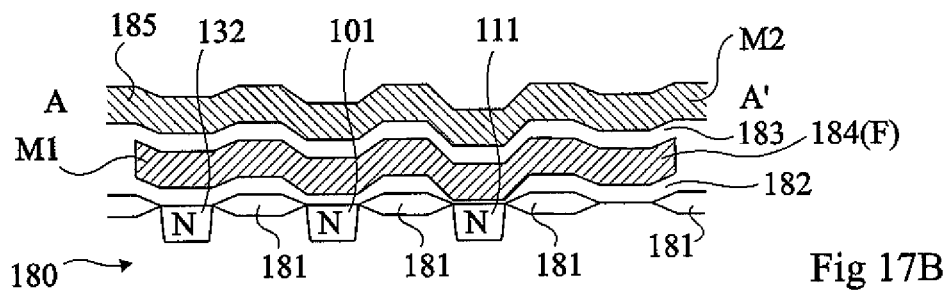
Figure 17C:
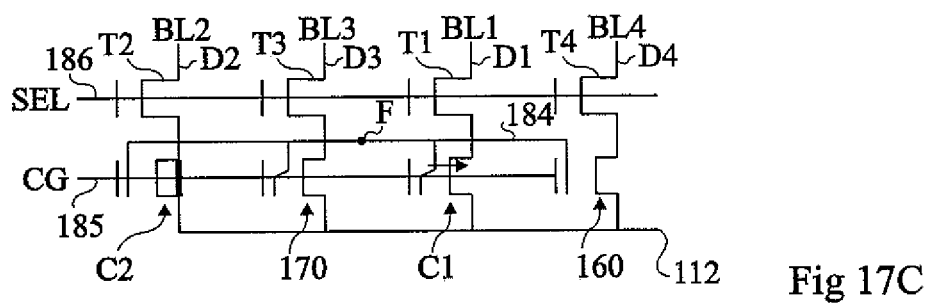

FIGS. 17A, 18A, 19A, 20A, and 21A are simplified top views, respectively of the electronic charge retention circuit and of its elements C2, 170, C1, and 160. FIG. 17B is a cross-section view along line AA' of FIG. 17A. FIGS. 18B, 19B, 20B, and 21B respectively are cross-sections along lines BB' of FIGS. 18A, 19A, 20A, 21A. FIGS. 17C, 18C, 19C, 20C, and 21C show the respective equivalent electric diagrams of the electronic charge retention circuit and of its elements C2, 170, C1, and 160.

In the described example, the forming of N-channel transistors in a P-type silicon substrate 180 (FIG. 17B) is assumed. The opposite is, of course, possible.

Each element or cell C2, 170, C1, or 160 is obtained from a floating-gate transistor series-connected with a single-gate selection transistor T2, T3, T1, or T4 to select, for example, from an EEPROM cell array network, the electronic charge retention circuit.

The floating gates of the different transistors forming elements C2, 170, C1, and 160 are interconnected (conductive line 184) to form floating node F. Their control gates are connected together to a conductive line 185 of application of read control signal CG. Their respective sources SC2, S7, SC1, and S6 are interconnected to terminal 112 (the ground) and their respective drains DC2, D7, DC1, and D6 are connected to the respective sources of selection transistors T2, T3, T1, and T4.

The gates of transistors T1 to T4 are connected together to a conductive line 186 of application of a circuit selection signal SEL. Their respective drains D1 to D4 are connected to individually-controllable bit lines BL1 to BL4. The order of the bit lines in FIG. 17C has been arbitrarily illustrated as BL2, BL3, BL1, and BL4 but the order of the different elements C2, 170, C1, and 160 and in the horizontal row direction (in the orientation of the drawings) is indifferent.

In this embodiment, N-type source and drain regions separated from one another in the line direction by insulating areas 181 are assumed (FIG. 17B). The floating gates are formed in a first conductive level M1 separated from the active regions by an insulating level 182 and the control gates are formed in a second conductive level M2 separated from the first one by a third insulating level 183. The gates of the selection transistors are formed, for example, in level M2.

A difference with a usual EEPROM cell network is that the floating gates are interconnected by groups of four transistors to form floating node F. Another difference is that the floating-gate transistors forming the different circuit elements are different from one another across the thickness of their tunnel window and/or across their drain and source connection.

FIG. 18A to 18C illustrate the forming of storage capacitor C2. Drain DC2 and source SC2 of the corresponding floating-gate transistor are short-circuited (by extension of the $N^+$-type implantation across the entire active area, FIG. 18B) to form electrode 132 of the capacitor. Further, the tunnel window is eliminated with respect to a standard EEPROM cell.

FIG. 19A to 19C illustrate the forming of transistor 170 forming capacitive programming element C3. It is a standard EEPROM cell having the extension 201 of its N doped area under tunnel window 202 (FIG. 19B) which provides a platform in the charge injection area. As a standard EEPROM cell, drain area D7 is connected to the source of selection transistor T3. Source area S7 is connected to terminal 112.

Figure 20A:
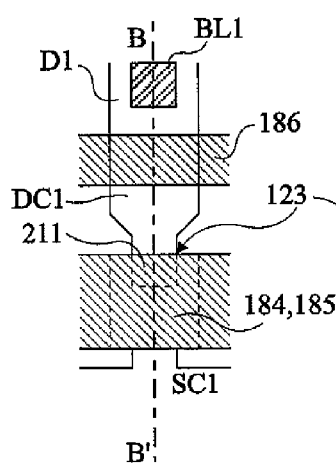
FIGS. 20A, 20B, and 20C respectively are a top view, a cross-section view along the second direction, and the equivalent electric diagram of a third element of the circuit of FIG. 17A to 17C.
Figure 20B:
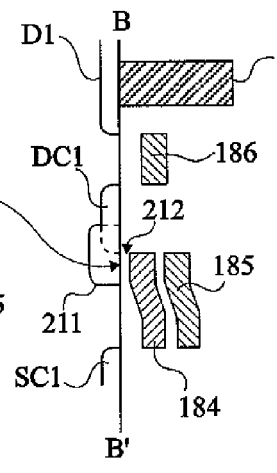
Figure 20C:
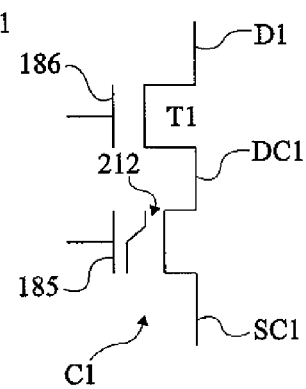

FIG. 20A to 20C illustrate the forming of capacitive element C1 forming the charge retention circuit leakage element. As compared with a standard EEPROM cell, a difference is to thin down (area 212, FIG. 20B) the dielectric window used for the tunnel effect to increase leakages. For example, the thickness of dielectric 212 is selected to be approximately half (for example, between 30 and 40 angstroms) that (for example, between 70 and 80 angstroms) of a tunnel window (202, FIG. 19B) of an unmodified cell.

Figure 21A:
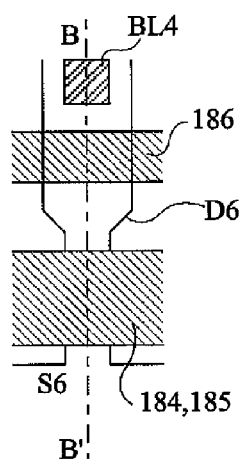
FIGS. 21A, 21B, and 21C respectively are a top view, a cross-section view along the second direction, and the equivalent electric diagram of a fourth element of the circuit of FIG. 17A to 17C.
Figure 21B:
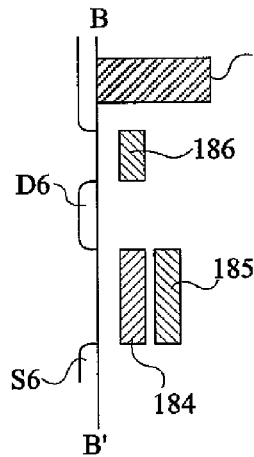
Figure 21C:
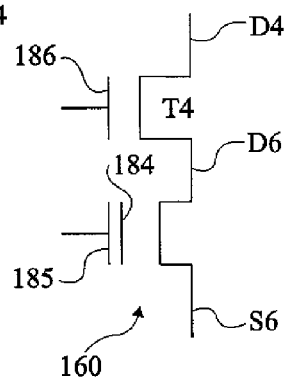

FIG. 21A to 21C illustrate the forming of read transistor 160 in which the tunnel window has been eliminated as well as, preferably, the usual implanted area (201, FIG. 19B) of an EEPROM cell. The active area limited by source S6 and drain D6 is thus similar to that of a normal MOS transistor.

The representations of FIG. 17A to 21C are simplified and may be adapted to the used technology. In particular, the gates have been shown as aligned with the limits of the drain and source areas but a slight overlapping is often present.

An advantage of the embodiment by means of an EEPROM cell technology is that the charge retention circuit may be programmed and reset by applying the same voltage levels and the same time windows as those used to delete or write into EEPROM cells.

Another advantage is that this preserves a stability along time by avoiding damages to the thin oxide of the leakage element (C1) in successive write operations.

The respective connections of bit lines BL1 to BL4 depend on the circuit operating phases and especially on the programming (activation) or read phase.

Table I hereafter illustrates an embodiment of an activation (SET) and a reading (READ) of an electronic charge retention circuit such as illustrated in FIG. 17A to 21C.

TABLE I

|  | SEL | CG | BL2 | BL3 | BL1 | BL4 | 112 |
| --- | --- | --- | --- | --- | --- | --- | --- |
| SET | $VPP_1$ | 0 | HZ | $VPP_2$ | HZ | HZ | HZ |
| READ | $V_{SEL}$ | $V_{READ}$ | HZ | HZ | HZ | $V_{114}$ | 0 |

In an activation phase SET (switching of the stored bit to state 1), selection signal SEL is brought to a first high potential $VPP_1$ with respect to ground to turn on the different transistors T1 to T4 while signal CG applied on the control gates of the floating-gate transistors remains at low level 0 to avoid turning on transistor 160. Bit lines BL1, BL2, and BL4 remain floating (high impedance state HZ) while line BL3 is applied a positive voltage $VPP_2$ enabling charge of floating node F. Line 112, common to the sources of the floating-gate transistors, is preferentially left floating (state HZ).

For reading READ, the different selection transistors are activated by signal SEL to a level $V_{SEL}$ and a read voltage $V_{READ}$ is applied on the control gates of the floating-gate transistors. Lines BL1, BL2, and BL3 are high-impedance states HZ while line BL4 receives a voltage $V_{114}$ enabling powering the read current source. Line 112 is here grounded.

The relations between the different levels $VPP_1$, $VPP_2$, $V_{SEL}$, $V_{READ}$, and $V_{114}$ are, preferably, the following:

$VPP_1$ greater than $VPP_2$;

$V_{SEL}$ greater than $V_{READ}$;

$V_{READ}$ of the same order of magnitude as $V_{114}$.

According to a specific embodiment:

$VPP_1$=approximately 14 volts;

$VPP_2$=approximately 12 volts;

$V_{SEL}$=approximately 4 volts;

$V_{READ}$=approximately 2 volts; and $V_{114}$=approximately 1 volt.

What has been described hereabove in relation with one EEPROM cell per element of the charge retention circuit may of course be replaced with a structure in which subsets of several identical cells in parallel are used for the different respective elements. In particular:

several elements C2 may be used in parallel to increase the capacitance of node F to increase the electronic circuit discharge time;

several elements 170 may be used in parallel to increase the speed of electron injection or extraction into or from node F in a programming;

several leakage elements C1 may be used in parallel to decrease the system discharge time; and/or several read elements 160 may be introduced in parallel to provide a greater current on probing of the circuit.

An electronic charge retention circuit may be introduced in any position of a standard network of EEPROM cells, which enables making it more difficult to locate by a possible malicious user.

The cell-selection transistors forming the charge retention transistors may be shared with normal EEPROM cells on the same bit lines, provided to provide adapted addressing and switching means.

Specific embodiments and implementation modes have been described. Various alterations, modifications, and improvements will readily occur to those skilled in the art. In particular, the selection of the charge retention times depends on the application and on the duration desired for temporary keys.

Further, the charge retention circuit may be formed by any circuit capable of exhibiting, in reproducible fashion, a charge loss along time independently from the circuit power supply. For example, a circuit such as described in International patent application WO-A-03/083769 may be used.

Moreover, the practical forming of the circuit based on the functional indications given hereabove and on the needs of the application is within the abilities of those skilled in the art. The counters may be of any nature and the counting function may be of any increment or decrement. For example (especially in embodiments, for example, FIG. 12 and the following, where the counting cells cannot be reset other than along time), two incremental counters of finite size with their difference providing the value to be considered may be used. Further, although reference has more specifically been made to EEPROMs and RAMs, these memories are more generally any reprogrammable non-volatile memory or memory element (for example, flash memories) and any memory or volatile storage element (for example, registers).

Finally, especially since it requires no permanent power supply, embodiments of the present invention may be implemented in contactless devices (of electromagnetic transponder type) which draw their power supply from an electromagnetic field in which they are located (generated by a terminal).

Such alterations, modifications, and improvements are intended to be part of this disclosure, and are intended to be within the spirit and the scope of the present invention.

Accordingly, the foregoing description is by way of example only and is not intended to be limiting. The present invention is limited only as defined in the following claims and the equivalents thereto.

What is claimed is:

1. A method for obtaining, in an electronic circuit, at least one first key for use in a cryptographic mechanism, from at least one second key contained in the electronic circuit, wherein said at least one first key is stored in at least one first storage element of the electronic circuit, said at least one first storage element containing said at least one first key being automatically reset after a time period independent of whether the electronic circuit is powered or not.

2. The method of claim 1, wherein a number of uses of the at least one first key within a given period is limited by a counter stored in a second storage element automatically reset after a time period independent of whether the electronic circuit is powered or not.

3. The method of claim 1, wherein the at least one second key is contained in a non-volatile storage element of the electronic circuit.

4. The method of claim 1, wherein the at least one first key is obtained by derivation of the at least one second key.

5. A method for controlling the use of ink cartridges by means of a circuit associated with a printer and of a key derived from an identifier provided by a cartridge, wherein said derived key corresponds to the first key of the method of claim 4.

6. The method of claim 1, wherein the second key is used to obtain the at least one first key by deciphering.

7. The method of claim 1, wherein the at least one first key is used as a base for deriving a third key used to cipher or to authenticate data coming from outside of the electronic circuit.

8. A method of ciphered transmission of digital data, wherein the third key of claim 7 is used for deciphering data.

9. A method for deriving a session key of an EMV application, wherein the session key corresponds to the third key of the method of claim 7.

10. An electronic circuit comprising cryptographic processing means and at least one non-volatile memory, comprising at least one storage element provided with at least one first capacitive element exhibiting a leakage through its dielectric space, this first storage element forming said first storage element of the method of claim 1.

11. The circuit of claim 10, comprising means adapted to implement the method of claim 1.

12. An integrated circuit card, comprising the circuit of claim 10.

13. A bank transaction system using integrated circuit cards of claim 12, said first key being used to derive session keys corresponding to the transactions.

14. An electronic key, comprising the circuit of claim 10.

15. A system for broadcasting a digital content, comprising:

a transmitter capable of ciphering the digital content based on a periodically-changing control word transmitted, with the ciphered digital content, in ciphered fashion from at least one first temporary key having a period greater than that of the periodically-changing control word; and a receiver associated with an electronic circuit capable of deciphering the control word based on said at least one first temporary key and of then deciphering the ciphered digital content based on the control word, said electronic circuit performing the method of claim 1.

16. A receiver of the system of claim 15, comprising said electronic circuit.

17. A system for controlling the use of ink cartridges by a printer, comprising:
- at least one printer associated with at least one electronic circuit of claim 10; and
- at least one ink cartridge adapted to transmitting an identifier enabling the circuit of the printer to generate said first key.

18. A printer of the system of claim 17.

19. A cartridge intended for the printer of claim 18, comprising an electronic circuit provided with a storage element automatically reset after a time period independent from the fact that the circuit is powered or not, this element containing said identifier.

20. A method for processing cryptographic keys, comprising:
- obtaining, by an electronic circuit, a first key from a second key that is stored in the electronic circuit;
- storing, by the electronic circuit, the first key in a first storage element, the first storage element containing the first key configured to automatically reset at the end of a first time period that is independent of whether power is applied to the electronic circuit; and
- using, by the electronic circuit, the first key to execute the cryptographic process until the first storage element resets.

21. A method as defined in claim 20, further comprising incrementing or decrementing a counter for each use of the first key and limiting use of the first key when the counter reaches a threshold value, wherein the counter is configured to automatically reset at the end of a second time period that is independent of whether power is applied to the electronic circuit.

22. A method as defined in claim 21, wherein the counter comprises one or more charge retention circuits, each including at least one first capacitive element having a leakage that discharges the first capacitive element to a reset state at the end of the second time period.

23. A method as defined in claim 20, wherein the second key is stored in a non-volatile storage element of the electronic circuit.

24. A method as defined in claim 20, further comprising deriving a third key from the first key and using the third key to cipher or to authenticate data received from outside of the electronic circuit.

25. A method as defined in claim 20, wherein the first storage element comprises one or more charge retention circuits, each including at least one first capacitive element having a leakage that discharges the first capacitive element to a reset state at the end of the first time period.

26. A method as defined in claim 25, wherein the at least one first capacitive element has a first electrode connected to a floating node and wherein the one or more charge retention circuits each further comprise at least one second capacitive element having a first electrode connected to the floating node, the second capacitive element having a larger capacitance and a smaller leakage than the first capacitive element, a measurement circuit connected to the floating node to measure a residual charge of the floating node and a third capacitive element having an electrode connected to the floating node for injecting charges into or extracting charges from the floating node.

27. An electronic circuit comprising:
- a first storage element configured to automatically reset at the end of a first time period that is independent of whether power is applied to the electronic circuit; and
- a processing unit and a memory containing instructions that, when executed by the processing unit, perform a cryptographic process, the instructions configured to:
    - obtain a first key from a second key stored in the electronic circuit;
    - store the first key in the first storage element, wherein the first storage element containing the first key is automatically reset at the end of the first time period; and
    - use the first key to execute the cryptographic process until the first storage element resets.

28. An electronic circuit as defined in claim 27, further comprising a counter configured to automatically reset at the end of a second time period that is independent of whether power is applied to the electronic circuit and wherein the instructions are further configured to increment or decrement the counter for each use of the first key and to limit the use of the first key when the counter reaches a threshold value.

29. An electronic circuit as defined in claim 28, wherein the counter comprises one or more charge retention circuits, each including at least one first capacitive element having a leakage that discharges the first capacitive element to a reset state at the end of the second time period.

30. An electronic circuit as defined in claim 27, wherein the instructions are further configured to derive a third key from the first key and to use the third key to cipher or to authenticate data received from outside of the electronic circuit.

31. An electronic circuit as defined in claim 27, wherein the first storage element comprises one or more charge retention circuits, each including at least one first capacitive element having a leakage that discharges the first capacitive element to a reset state at the end of the first time period.

32. An electronic circuit as defined in claim 31, wherein the at least one first capacitive element has a first electrode connected to a floating node and wherein the one or more charge retention circuits each further comprise at least one second capacitive element having a first electrode connected to the floating node, the second capacitive element having a larger capacitance and a smaller leakage than the first capacitive element, a measurement circuit connected to the floating node to measure a residual charge of the floating node and a third capacitive element having an electrode connected to the floating node for injecting charges into or extracting charges from the floating node.

* * * * *